(12) United States Patent
Ha et al.

(10) Patent No.: US 11,816,557 B2
(45) Date of Patent: *Nov. 14, 2023

(54) METHOD AND APPARATUS WITH NEURAL NETWORK PARAMETER QUANTIZATION

(71) Applicant: Samsung Electronics Co., Ltd., Suwon-si (KR)

(72) Inventors: Sangwon Ha, Seongnam-si (KR); Gunhee Kim, Suwon-si (KR); Donghyun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,342

(22) Filed: Sep. 22, 2022

(65) Prior Publication Data
US 2023/0017432 A1 Jan. 19, 2023

Related U.S. Application Data

(63) Continuation of application No. 16/909,095, filed on Jun. 23, 2020, now Pat. No. 11,481,608.

(30) Foreign Application Priority Data
Dec. 27, 2019 (KR) .......................... 10-2019-0176734

(51) Int. Cl.
*G06N 3/00* (2023.01)
*G06N 3/063* (2023.01)
(Continued)

(52) U.S. Cl.
CPC ............. *G06N 3/063* (2013.01); *G06F 17/18* (2013.01); *G06F 18/10* (2023.01);
(Continued)

(58) Field of Classification Search
CPC ......... G06N 3/04; G06N 3/0472; G06F 18/10;
(Continued)

(56) References Cited

U.S. PATENT DOCUMENTS

| 6,239,730 B1 | 5/2001 | Wenger |
| 7,505,852 B2 | 3/2009 | Board |

(Continued)

FOREIGN PATENT DOCUMENTS

| GB | 2568084 A | 5/2019 |
| KR | 10-2019-0050141 A | 5/2019 |

(Continued)

OTHER PUBLICATIONS

Banner, Ron, et al., "ACIQ: analytical clipping for integer quantization of neural networks.", *ICLR 2019 Conference Blind Submission*, (2018) (9 pages in English).

(Continued)

*Primary Examiner* — Manav Seth
(74) *Attorney, Agent, or Firm* — NSIP Law

(57) ABSTRACT

A processor-implemented neural network method includes: determining a respective probability density function (PDF) of normalizing a statistical distribution of parameter values, for each channel of each of a plurality of feature maps of a pre-trained neural network; determining, for each channel, a corresponding first quantization range for performing quantization of corresponding parameter values, based on a quantization error and a quantization noise of the respective determined PDF; determining, for each channel, a corresponding second quantization range, based on a signal-to-quantization noise ratio (SQNR) of the respective determined PDF; correcting, for each channel, the corresponding first quantization range based on the corresponding second quantization range; and generating a quantized neural network, based on the corrected first quantization range corresponding for each channel.

13 Claims, 12 Drawing Sheets

(51) Int. Cl.
*G06F 17/18* (2006.01)
*G06F 18/10* (2023.01)
*G06F 18/2321* (2023.01)
*G06N 3/047* (2023.01)
*G06V 10/764* (2022.01)

(52) U.S. Cl.
CPC .......... *G06F 18/2321* (2023.01); *G06N 3/047* (2023.01); *G06V 10/764* (2022.01)

(58) Field of Classification Search
CPC .... G06F 17/2321; G06F 17/18; G06K 9/6226; G06K 9/6298
See application file for complete search history.

(56) References Cited

U.S. PATENT DOCUMENTS

| | | | |
|---|---|---|---|
| 8,131,107 | B2 | 3/2012 | Sun et al. |
| 8,175,404 | B2 | 5/2012 | Bichlmaier et al. |
| 8,295,597 | B1* | 10/2012 | Sharma et al. ......... G06V 20/41 |
| | | | 382/173 |
| 10,818,309 | B2 | 10/2020 | Lee et al. |
| 11,310,509 | B2 | 4/2022 | Topiwala et al. |
| 11,354,543 | B2 | 6/2022 | Su |
| 11,360,459 | B2 | 6/2022 | Cella et al. |
| 11,481,608 | B2* | 10/2022 | Ha et al. ................. G06F 17/18 |
| 2006/0111844 | A1 | 5/2006 | Chandler |
| 2016/0328646 | A1 | 11/2016 | Lin et al. |
| 2016/0328647 | A1 | 11/2016 | Lin et al. |
| 2018/0046896 | A1 | 2/2018 | Yu et al. |
| 2019/0042948 | A1 | 2/2019 | Lee et al. |
| 2019/0130255 | A1 | 5/2019 | Yim et al. |
| 2019/0147322 | A1* | 5/2019 | Kim et al. ............. G06N 3/048 |
| | | | 706/16 |
| 2019/0180177 | A1 | 6/2019 | Yim et al. |
| 2020/0026986 | A1 | 1/2020 | Ha et al. |
| 2020/0387797 | A1 | 12/2020 | Ryan et al. |

FOREIGN PATENT DOCUMENTS

KR  10-2019-0068255 A  6/2019

OTHER PUBLICATIONS

Jacob, Benoit, et al., "Quantization and training of neural networks for efficient integer-arithmetic-only inference." *Proceedings of the IEEE Conference on Computer Vision and Pattern Recognition.* 2018 (14 pages in English).

Krishnamoorthi, Raghuraman. "Quantizing deep convolutional networks for efficient inference: A whitepaper." *arXiv preprint arXiv:1806.08342* (2018) (36 pages in English).

* cited by examiner

METHOD AND APPARATUS WITH NEURAL NETWORK PARAMETER QUANTIZATION

CROSS-REFERENCE TO RELATED APPLICATION

This application is a continuation of U.S. Pat. Application No. 16/909,095, filed on Jun. 23, 2020, which claims the benefit of Korean Patent Application No. 10-2019-0176734, filed on Dec. 27, 2019 in the Korean Intellectual Property Office, the disclosures of which are incorporated by reference herein in their entirety for all purposes.

BACKGROUND

1. Field

The present disclosure relates to a method and apparatus for with neural network parameter quantization.

2. Description of the Related Art

A neural network may refer to a computational architecture. Various types of electronic systems may analyze input data and extract effective information by using a neural network device.

A neural network may have a multi-layer structure, and channels included in each layer may have parameter values (e.g., activations and weights).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: determining a respective probability density function (PDF) of normalizing a statistical distribution of parameter values, for each channel of each of a plurality of feature maps of a pre-trained neural network; determining, for each channel, a corresponding first quantization range for performing quantization of corresponding parameter values, based on a quantization error and a quantization noise of the respective determined PDF; determining, for each channel, a corresponding second quantization range, based on a signal-to-quantization noise ratio (SQNR) of the respective determined PDF; correcting, for each channel, the corresponding first quantization range based on the corresponding second quantization range; and generating a quantized neural network, based on the corrected first quantization range corresponding for each channel.

The determining of the corresponding first quantization range may include, for each channel: determining the quantization error and the quantization noise; determining a statistical lower value and a statistical upper value of the parameter values such that the sum of the quantization error and the quantization noise is a minimum; and determining a range between the statistical lower value and the statistical upper value to be the first quantization range.

An absolute value of the statistical lower value may be equal to an absolute value of the statistical upper value.

The determining of the corresponding second quantization range may include, for each channel: performing quantization of the parameter values for each piece of data of a data set, based on the determined PDF; from a result of the quantization, obtaining a statistical point of the parameter values where the SQNR is maximum, for each piece of the data of the data set; calculating a critical point, based on a normalized weighted sum operation of the statistical points; and determining the second quantization range, based on the critical point.

The calculating of the critical point may include using respective SQNRs of the statistical points as a weight for a normalized weighted sum operation.

The determining of the corresponding second quantization range may include, for each channel, determining an absolute value of the critical point to be an absolute value of a lower value and an absolute value of an upper value of the second quantization range.

The correcting of the corresponding first quantization range may include, for each channel, correcting the first quantization range to the second quantization range, in response to the first quantization range being less than the second quantization range.

The correcting of the corresponding first quantization range may include, for each channel: in response to a lower value of the first quantization range being greater than a lower value of the second quantization range, correcting the lower value of the first quantization range to the lower value of the second quantization range, and in response to an upper value of the first quantization range being less than an upper value of the second quantization range, correcting the upper value of the first quantization range to the upper value of the second quantization range.

The determining of the PDF may include, for each channel: inputting a data set to the pre-trained neural network; obtaining, for each channel, profile information of the parameter values that correspond to an input of the data set; and determining, for each channel, one of a plurality of PDFs as corresponding to the profile information.

The plurality of PDFs may include any combination of any two or more of a LaPlace distribution, a hyper secant distribution, a logistic distribution, a Gaussian distribution, a raised-cosine distribution, a Wigner distribution, a uniform distribution, and a Super Cauchy distribution.

The generating of the quantized neural network may include: determining, for each channel, a fixed-point expression of the parameter values within the corrected first quantization range, based on the predetermined PDF; and quantizing, for each channel, the parameter values to fixed-point parameter values, based on the determined fixed-point expression.

The parameter values may include floating-point activations used by each channel of each of the plurality of feature maps.

The method may include: receiving input data corresponding to image data; and performing, using the generated quantized neural network, image recognition based on the received input data.

A non-transitory computer-readable storage medium may store instructions that, when executed by a processor, configure the processor to perform the method.

In another general aspect, a neural network apparatus includes: a processor configured to: determine a respective probability density function (PDF) of normalizing a statistical distribution of parameter values, for each channel of each of a plurality of feature maps of a pre-trained neural network; determine, for each channel, a corresponding first quantization range for performing quantization of the corresponding parameter values, based on a quantization error and quantization noise of the respective determined PDF; determine, for each channel, a corresponding second quantization range, based on a signal-to-quantization noise ratio (SQNR) of the respective determined PDF; correct, for each channel, the corresponding first quantization range based on the corresponding second quantization range; and generate a quantized neural network, based on the corrected first quantization range corresponding for each channel.

For the determining of the corresponding first quantization range, the processor may be configured to, for each channel: determine the quantization error and the quantization noise; determine a statistical lower value and a statistical upper value of the parameter values such that the sum of the quantization error and the quantization noise is a minimum; and determine a range between the statistical lower value and the statistical upper value to be the first quantization range.

An absolute value of the statistical lower value may be equal to an absolute value of the statistical upper value.

For the determining of the corresponding second quantization range, the processor may be configured to, for each channel: perform quantization of the parameter values for each piece of data of a data set, based on the determined PDF; obtain, from a result of the quantization, a statistical point of the parameter values where the SQNR is maximum, for each piece of the data of the data set; calculate a critical point, based on a normalized weighted sum operation of the statistical points; and determine the second quantization range, based on the critical point.

For the calculating of the critical point, the processor may be configured to use respective SQNRs of the statistical points as a weight for a normalized weighted sum operation.

For the determining of the corresponding second quantization range, the processor may be configured to, for each channel, determine an absolute value of the critical point to be an absolute value of a lower value and an absolute value of an upper value of the second quantization range.

For the correcting of the corresponding first quantization range, the processor may be configured to, for each channel, in response to a lower value of the first quantization range being greater than a lower value of the second quantization range, correct the lower value of the first quantization range to the lower value of the second quantization range, and in response to an upper value of the first quantization range is less than an upper value of the second quantization range, correct the upper value of the first quantization range to the upper value of the second quantization range.

The parameter values may include floating-point activations used by each channel of each of the plurality of feature maps.

The apparatus may be any one of a personal computer (PC), a server device, a mobile device, a smartphone, a tablet device, an augmented reality (AR) device, an Internet of Things (IoT) device, an autonomous vehicle, a robotic device, and a medical device, and the processor may be configured to perform either one of voice recognition and image recognition using the generated quantized neural network.

The apparatus may include a memory storing instructions that, when executed by the processor, configure the processor to perform the determining of the PDF, the determining of the corresponding first quantization range, the determining of the corresponding second quantization range, the correcting of the first quantization range, and the generating of the quantized neural network.

Other features and aspects will be apparent from the following detailed description, the drawings, and the claims.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
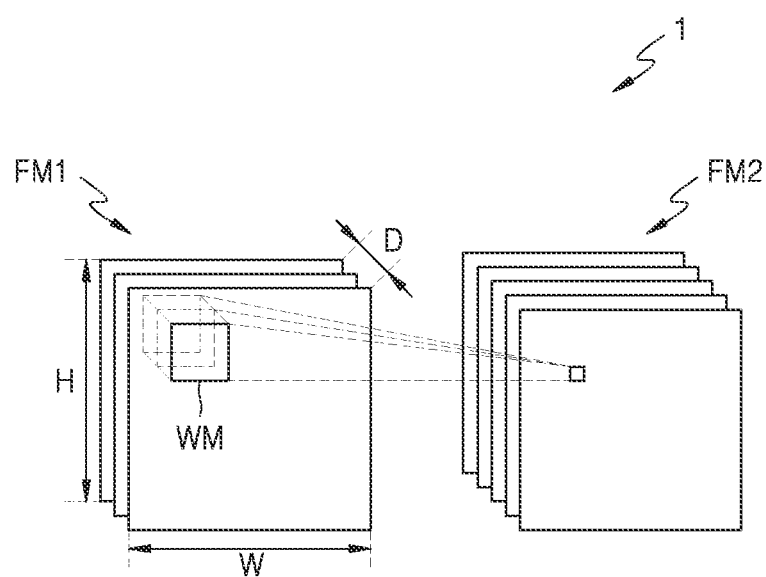
FIG. 1 illustrates a convolutional operation according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Reference will now be made in detail to embodiments, examples of which are illustrated in the accompanying drawings, wherein like reference numerals refer to the like elements throughout. In this regard, the one or more embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Throughout the descriptions of embodiments, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this specification, specify the presence of stated elements, but do not preclude the presence or addition of one or more other elements.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The term used in the embodiments such as "unit", etc., indicates a unit for processing at least one function or operation, and where the unit is hardware or a combination of hardware and software.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

The descriptions of embodiments below should not be construed as limiting the right scope of the accompanying claims, and it should be construed after an understanding of the present disclosure of this application that all of the technical ideas included within the scope equivalent to the claims are included within the right scope of embodiments. Exemplary embodiments of the present disclosure will now be described more fully with reference to the accompanying drawings.

To efficiently process an operation related to a neural network, one or more embodiments of the present disclosure may convert a floating-point parameter value into a fixed-point parameter value.

FIG. 1 illustrates a convolutional operation according to one or more embodiments.

Referring to FIG. 1, a computational graph 1 is a graph showing a mathematical model represented by nodes and edges. The architecture of the computational graph 1 may correspond to the architecture of a neural network, or may correspond to the architecture of various other models. The neural network may be a deep neural network (DNN) or an n-layer neural network. The DNN or n-layer neural network may correspond to a convolutional neural network (CNN), a recurrent neural network (RNN), a deep belief network, and/or a restricted Boltzman machine. For example, the neural network may be implemented as a CNN, but is not limited thereto. When the computational graph 1 of FIG. 1 represents a CNN, the computational graph 1 may correspond to some of the layers of the CNN. Accordingly, the computational graph 1 may correspond to a convolutional layer, a pooling layer, and a fully connected layer of the CNN. In the following description, however, for convenience of explanation, the computational graph 1 may correspond to a convolutional layer of the CNN. However, embodiments are not limited thereto, and the computational graph 1 may correspond to representations of other mathematical models.

In the convolutional layer, a first feature map FM1 may correspond to an input feature map, and a second feature map FM2 may correspond to an output feature map. For example, the first feature map FM1 may mean a set of data expressing various features of input data, and the second feature map FM2 may mean a data set representing various features of output data resulting from convolution operations being performed by applying a weight map WM to the first feature map FM1. The first and second feature maps FM1 and FM2 may be high-dimensional matrices of two or more dimensions (and each may include parameters used for or resulting from activation operations). When the first and second feature maps FM1 and FM2 correspond to, for example, three-dimensional feature maps, each of the first and second feature maps FM1 and FM2 may have a width W (or a column), a height H (or a row), and a depth D. The depth D may be referred to as the number of channels.

In the convolution operation performed between the first feature map FM1 and the weight map WM to generate the second feature map FM2, the weight map WM may be used to filter the first feature map FM1 and may be referred to as a filter or a kernel. In an example, the depth of the weight map WM (that is, the number of channels of the weight map WM) may be equal to a product of the depth of the first feature map FM1 and the depth of the second feature map FM2 (that is, a product of the number of channels of the first feature map FM1 and the number of channels of the second feature map FM2). When the weight map WM is a four-dimensional matrix and the size of a kernel is k, the number of channels of the weight map WM may be calculated according to the expression "the depth of the first feature map FM1 × the depth of the second feature map FM2 × k × k".

The weight map WM may be shifted to slide over an entire area of the first feature map FM1, acting as a sliding window. During each shift, each of the weights included in the weight map WM may be multiplied by a feature value of the first feature map FM1 at a corresponding position in an area of the first feature map FM1 overlapped by the weight map WM, and then the products of all of the multiplications may be added together. A stride may correspond to the number of pixels by which the weight map WM slides between shifts. As the first feature map FM1 and the weight map WM are convolved with each other, a channel of the second feature map FM2 may be generated. Although FIG. 1 illustrates one weight map WM, a plurality of weight maps (or a plurality of channels of the weight map WM) may be convolved with the first feature map FM1 to generate a plurality of channels of the second feature map FM2.

The second feature map FM2 of the convolutional layer may then be used as an input feature map of a next layer. For example, the second feature map FM2 may be an input feature map of a subsequent pooling layer, or the second feature map FM2 may be an input feature map of a subsequent convolutional layer.

Figure 2:
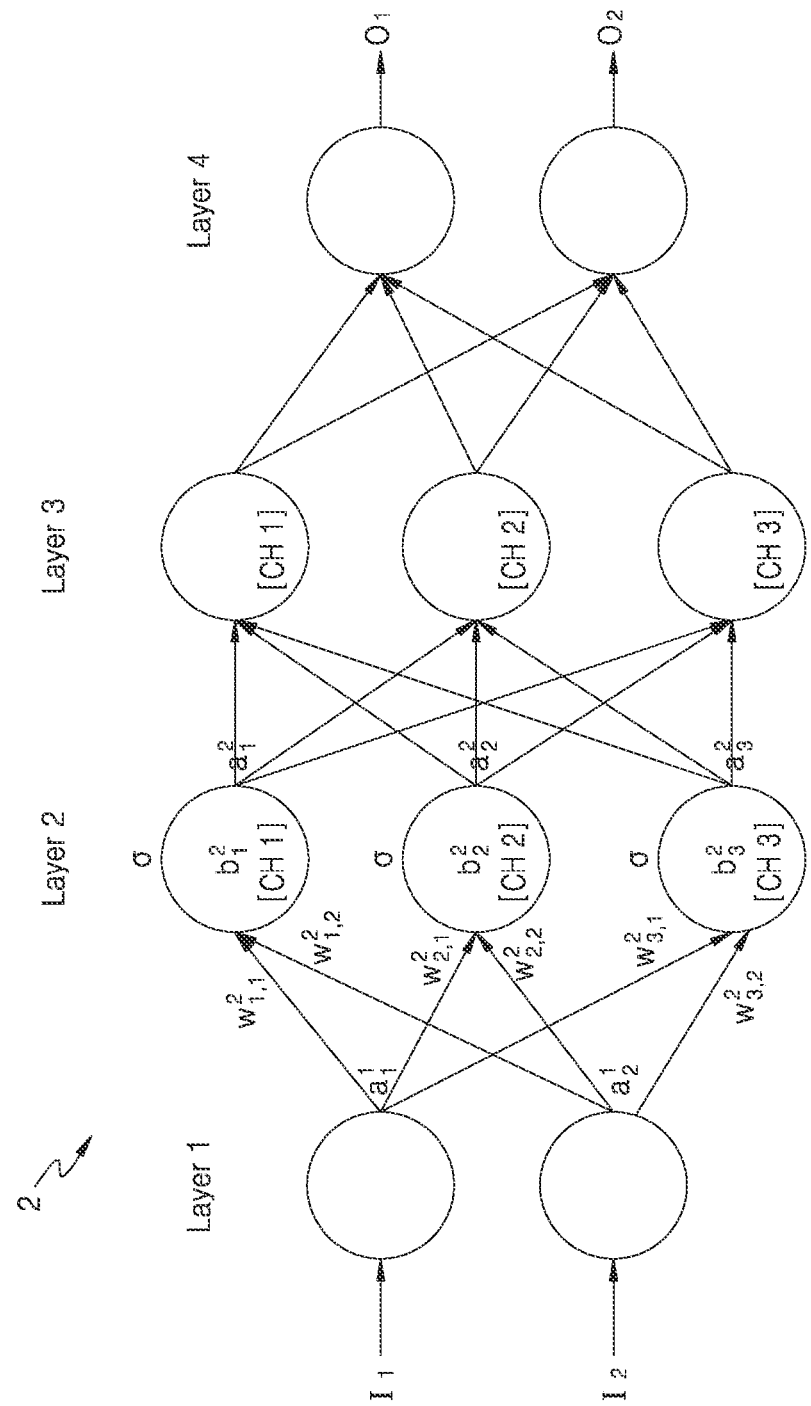
FIG. 2 illustrates an operation performed in a neural network according to one or more embodiments.

FIG. 2 illustrates an operation performed in a neural network 2 according to one or more embodiments.

Referring to FIG. 2, the neural network 2 may have a structure including an input layer, hidden layers, and an output layer, and may perform an operation based on received input data (for example, $I_1$ and $I_2$) and may generate output data (for example, $O_1$ and $O_2$), based on a result of the above operations.

As described above with reference to FIG. 1, the neural network 2 may be a DNN or an n-layer neural network each including two or more hidden layers. For example, as illustrated in FIG. 2, the neural network 2 may be a DNN including an input layer (Layer 1), two hidden layers (Layer 2 and Layer 3), and an output layer (Layer 4).

When the neural network 2 is implemented by a DNN architecture, the neural network 2 may include many layers capable of processing information, and thus may process more complicated data sets than a neural network having a single layer. Although the neural network 2 is illustrated as including four layers, this is merely an example, and the neural network 2 may include more or fewer layers, or more or fewer nodes or channels of respective plural nodes. In other words, the neural network 2 may include layers having various structures different from the structure illustrated in FIG. 2.

Returning to FIG. 1, each of the layers included in the neural network 2 may include a plurality of channels, where each of the channels may include or represent a plurality of artificial nodes known as neurons, processing elements (PE), or other similar terms, configured to process data of the corresponding channel. While the nodes may be referred to as "artificial nodes" or "neurons," such reference is not intended to impart any relatedness with respect to how the neural network architecture computationally maps or thereby intuitively recognizes information and how a human's neurons operate. I.e., the terms "artificial nodes" or "neurons" are merely terms of art referring to the hardware implemented nodes of a neural network. As illustrated in FIG. 2, Layer 1 may include two channels (nodes), and each of Layer 2 and Layer 3 may include three channels (nodes). However, this is merely an example, and each of the layers included in the neural network 2 may include various other numbers of channels (nodes).

The channels included in the respective layers of the neural network 2 may be connected to each other to process data. For example, one channel may receive data from other channels and perform an operation on the data, and may output an operation result to other channels.

An output value of a channel may be referred to as an activation, or a value which results from such a predetermined activation function of the corresponding channel. The input and output of each of the channels may be referred to as an input activation and an output activation, respectively. In other words, an activation may be a parameter that is an output of one channel and is also inputs of channels included in the next layer, due to corresponding connection(s) with the next layer. Each of the channels may determine its own activation, based on resultant activations and weights received from the channels included in the previous layer. A weight may be a parameter used to calculate an output activation in each channel, and thus may be a value allotted to a connection between channels. For example, an output from a previous layer's channel may be provided to as an input to a channel of a next or subsequent layer through a weighted connection between the previous layer's channel and the channel of the next layer, with the weight of the weighted connection being variously adjusted during the training of the neural network until the neural network is trained for a desired objective. There may be additional connections to the channel of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

Accordingly, each of the channels, or representative nodes of such a channel, may be processed by a computational or a processing element each receiving an input (e.g., through, or by further considering, such weighted connections) and outputting an output activation, and the input and output of each of the channels may be mapped. The computational unit may be configured to perform the activation function for a node. As a non-limiting example, an activation $$a_j^i$$

may be calculated using Equation 1.

$$a_j^i = \sigma\left(\sum_k \left(w_{jk}^i \times a_k^{i-1}\right) + b_j^i\right) \quad \text{Equation 1}$$

In Equation 1, σ denotes an activation function, $$w_{jk}^i$$

denotes a weight from a k-th channel included in an (i-1)th layer to a j-th channel included in an i-th layer, $$b_j^i$$

denotes a bias of the j-th channel included in the i-th layer, and $$a_j^i$$

denotes an activation of the j-th channel of the i-th layer.

As illustrated in FIG. 2, an activation of a first channel CH 1 of a second layer (namely, Layer 2) may be denoted by $$a_1^2.$$

Furthermore, $a_1^2$ may have a value of $$a_1^2 = \sigma\left(w_{1,1}^2 \times a_1^1 + w_{1,2}^2 \times a_2^1 + b_1^2\right)$$

according to Equation 1. However, the above-described Equation 1 is merely an example for describing the activations and weights used to process data in the neural network 2, and the neural network 2 is not limited thereto. The activation may be a value obtained by passing, through a rectified linear unit (ReLU), a value obtained by applying an activation function to a sum of the activations received from the previous layer.

In a typical neural network, there is a technological problem in that numerous data sets may be exchanged between a plurality of channels interconnected with one another, and may undergo numerous operations while passing through layers. Accordingly, a neural network of one or more embodiments may minimize a loss of accuracy while advantageously reducing an amount of computation used to process complex input data, thereby increasing a processing speed and/or reducing a used processing power of processor-implemented devices on which the neural network of one or more embodiments may be implemented.

Figure 3:
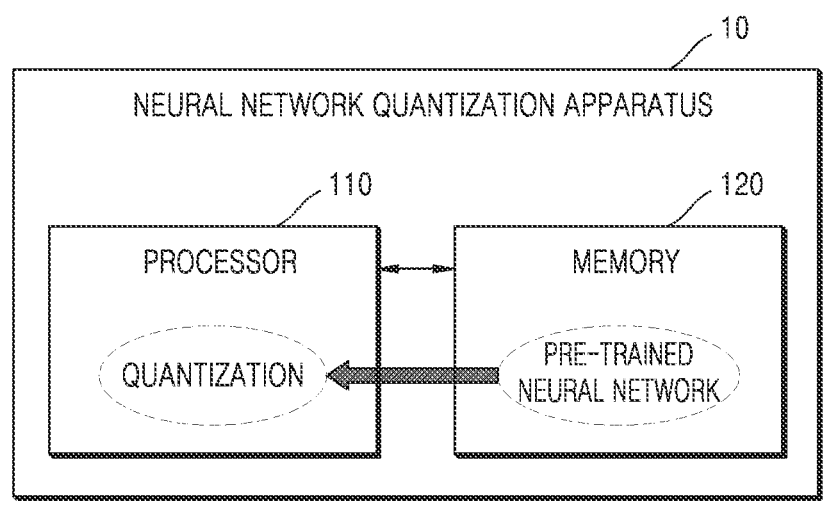
FIG. 3 illustrates a hardware structure of a neural network quantization apparatus according to one or more embodiments.

FIG. 3 illustrates a hardware structure of a neural network quantization apparatus 10 according to one or more embodiments.

Referring to FIG. 3, the neural network quantization apparatus 10 may include a processor 110 (e.g., one or more processors) and a memory 120 (e.g., one or more memories). It will be understood to one of ordinary skill in the art after an understanding of the present disclosure that the neural network quantization apparatus 10 may include further components other than those shown in FIG. 3.

The neural network quantization apparatus 10 may correspond to a computing device having various processing functions, such as functions to generate a neural network, train or learn the neural network, quantize a floating-point neural network to a fixed-point neural network, and/or retrain a neural network. For example, the neural network quantization apparatus 10 may be implemented as various types of devices such as personal computers (PCs), server devices, and mobile devices.

The processor 110 may perform all functions to control the neural network quantization apparatus 10. For example, the processor 110 may control all functions of the neural network quantization apparatus 10 by executing instructions stored in the memory 120 in the neural network apparatus 10. The processor 110 may be implemented as a central processing unit (CPU), a graphics processing unit (GPU), and/or an application processor (AP), which may be included in the neural network quantization apparatus 10, but the processor 110 is not limited thereto.

The memory 120 is hardware for storing various pieces of data processed in the neural network quantization apparatus 10. For example, the memory 120 may store data that has been processed and data that is to be processed in the neural network quantization apparatus 10. The memory 120 may also store applications and drivers to be driven by the neural network quantization apparatus 10.

The memory 120 may be, but is not limited to, dynamic random access memory (DRAM). The memory 120 may include at least one of volatile memory and nonvolatile memory. Examples of the nonvolatile memory may include read only memory (ROM), programmable ROM (PROM), electrically programmable ROM (EPROM), electrically erasable and programmable ROM (EEPROM), flash memory, phase-change random access memory (PRAM), magnetic random access memory (MRAM), resistive random access memory (RRAM), and ferroelectric random access memory (FeRAM). Examples of the volatile memory may include DRAM, static random access memory (SRAM), synchronous DRAM (SDRAM), PRAM, MRAM, RRAM, and FeRAM. According to an embodiment, the memory 120 may include at least one of a hard disk drive (HDD), a solid state drive (SSD), a compact flash (CF), a secure digital (SD) card, a micro-secure digital (Micro-SD) card, a mini-secure digital (Mini-SD) card, an extreme digital (xD) card, and a memory stick.

The processor 110 may generate a trained neural network by repeatedly or iteratively training an initial neural network. For example, as the initial neural network is trained, a pre-trained neural network may be generated. In this case, to secure accurate processing by a neural network, the initial neural network may have floating-point parameters, for example, parameters of 32-bit floating-point precision. The parameters may include various types of data input to and output from the neural network, for example, input activations, output activations, weights, and biases of the neural network. As the training of the neural network is repeated, the floating-point parameters of the neural network may be tuned to calculate a more accurate output for a given input.

However, a floating-point computation may necessitate a relatively large number of operations and relatively frequent memory accesses, compared to a fixed-point computation. In particular, most of the operations performed for processing by a neural network may be convolution operations for performing convolutions between various parameters. Accordingly, in mobile devices (e.g., smartphones, tablets, and wearable devices) and embedded devices that have a relatively low processing performance, processing by a typical neural network having floating-point parameters may not be smooth (e.g., the processing may be slow and not real-time). Thus, to generate an accurate neural network while reducing the number of operations in the above devices, and thereby increase the processing speed, one or more embodiments of the present disclosure may quantize the floating-point parameters processed in the neural network. The parameter quantization may include a conversion of a floating-point parameter to a fixed-point parameter.

The neural network quantization apparatus 10 may perform quantization corresponding to a conversion of floating-point parameters of a trained neural network to fixed-point parameters represented by a certain number of bits, considering the processing performance of an example device that implements the neural network.

The device that implements the neural network may be the neural network quantization apparatus 10 or may be a device that is different from the neural network quantization apparatus 10. The neural network quantization apparatus 10 may transmit a quantized neural network to the device that implements the neural network. For example, the device that implements the neural network may be a mobile device or an embedded device. In detail, the device that implements the neural network may be, but is not limited to, an autonomous vehicle, a robotics, a smartphone, a tablet device, an augmented reality (AR) device, and/or an Internet of Things (IoT) device, each of which may perform voice recognition or image recognition by using a neural network.

The generation of the pre-trained neural network through training of the initial neural network may be or may not be performed by the processor 110, as non-limiting examples. For example, the pre-trained neural network may be generated by a device other than the neural network quantization apparatus 10, and the processor 110 may receive a pre-trained neural network from the external device. For example, the processor 110 may receive from a server a pre-trained neural network generated by the server.

The processor 110 may store the pre-trained neural network in the memory 120. For example, the neural network stored in the memory 120 may be a neural network trained by the processor 110, and/or may be a neural network trained by another device.

The processor 110 may obtain data of a pre-trained neural network (e.g., a neural network pre-trained by using floating points) from the memory 120. The data of the pre-trained neural network may be data that has been repeatedly trained with floating-point parameters. The neural network may be trained by first repeatedly training a training data set as an input and then repeatedly training a test data set, but embodiments are not limited to this training. The training data set may be input data for training the neural network, and the test data set may be input data that is independent of the training data set and is used for training the neural network while measuring the performance of the neural network trained using the training data set.

The processor 110 may analyze, from the data of the pre-trained neural network, a statistical distribution for each channel of floating-point parameter values used in each of the channels included in each of feature maps and kernels of the pre-trained neural network. The processor 110 may analyze the statistical distribution by obtaining a statistic for each channel of the parameter values of the floating-point activations, weights, and biases used in each channel during the pre-training of the neural network.

The processor 110 may determine a fixed-point expression of a parameter for each channel, based on the analyzed statistical distribution for each channel. The processor 110 may determine the fixed-point expression of the parameter for each channel to statistically cover a distribution range of parameter values. Accordingly, a floating-point neural network may be converted to a fixed-point neural network. According to one or more embodiments of the present disclosure, because the conversion from the floating-point neural network to the fixed-point neural network is performed based on the statistical distribution for each channel, the fixed-point expression allotted to each channel may be the same as or different from the fixed-point expressions allotted to the other channels. In other words, a fractional length of the fixed-point expression of a parameter for each channel may be the same as or different from fractional lengths of the fixed-point expressions of parameters for the other channels.

Furthermore, the processor 110 may determine the fractional lengths of the weight for each channel and a bias, based on a result of performing the convolution operation between the feature maps and the kernels with parameters of the fixed-point expression for each channel. The fractional length of the bias and the fractional length of the weight for each channel may be set to be constraints of the quantized neural network.

An algorithm for quantizing a floating-point parameter for each channel to a fixed-point parameter using the processor 110 will be described below in detail with respect to corresponding drawings.

The memory 120 may store neural network-related data sets that have been processed or are to be processed by the processor 110. For example, the memory 120 may store data of an untrained initial neural network, data of a neural network generated in a training process, data of a neural network for which all kinds of training have been completed, and data of a quantized neural network. The memory 120 may also store various instructions related to training algorithms and quantization algorithms of a neural network which are to be executed by the processor 110.

Figure 4:
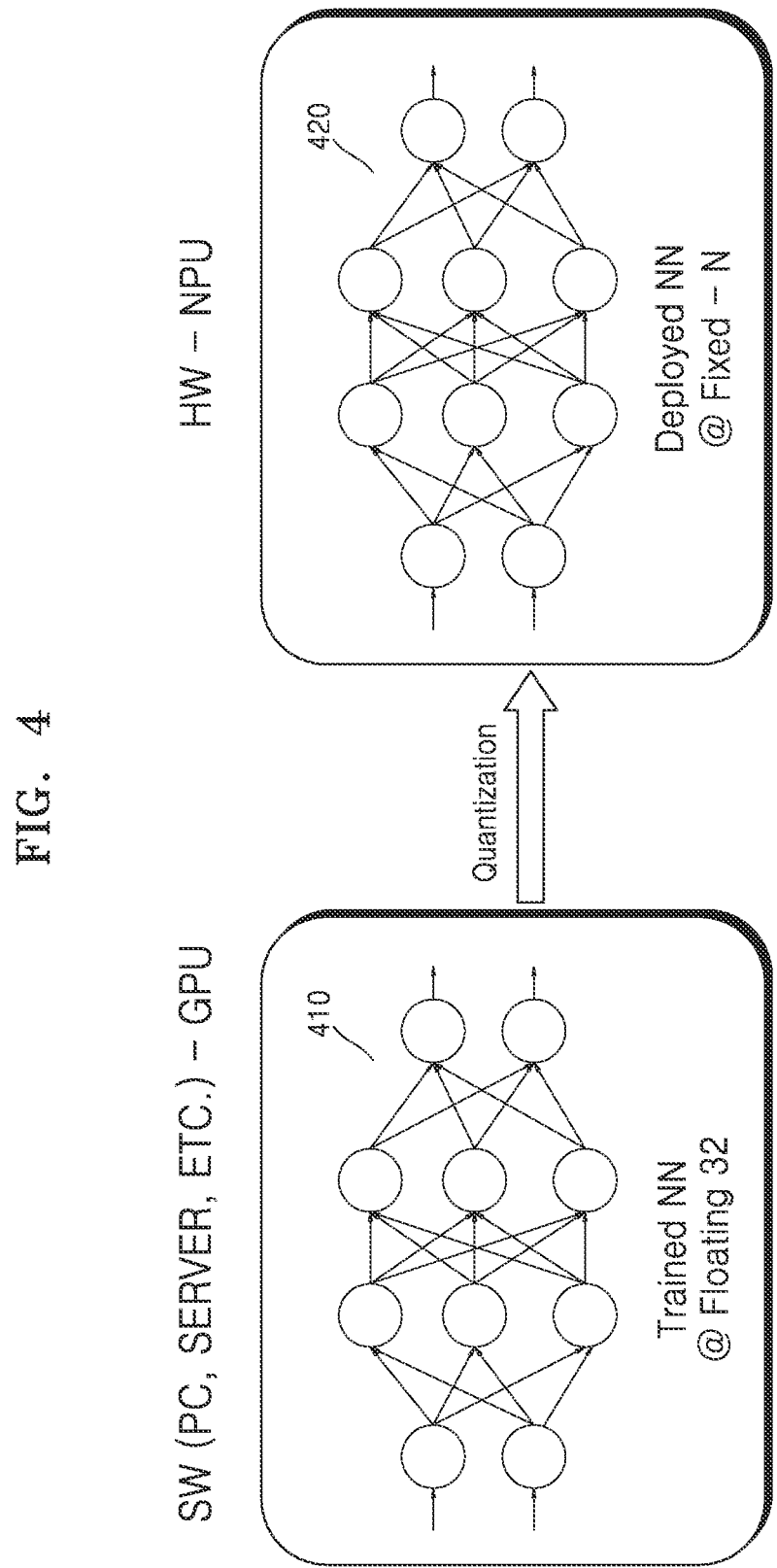
FIG. 4 illustrates a schematic view pre-trained neural network quantized and deployed by a hardware accelerator according to one or more embodiments.

FIG. 4 illustrates a schematic view pre-trained neural network is quantized and deployed by a hardware accelerator according to one or more embodiments.

Referring to FIG. 4, a processor of an external device such as a PC or a server may pre-train a floating-point neural network 410 (e.g., a 32-bit floating-point neural network) and then transmit the pre-trained floating-point neural network 410 to the neural network quantization apparatus 10. However, embodiments are not limited thereto. As described above with reference to FIG. 3, the pre-trained floating-point neural network 410 may be generated by the processor 110 of the neural network quantization apparatus 10.

There is a technological problem in that the pre-trained floating-point neural network 410 may not be efficiently processed in a low-power or low-performance hardware accelerator because of its floating-point parameters. Accordingly, to improve the functioning of a computer with the low-power or low-performance hardware accelerator on which a neural network may be implemented, the processor 110 may quantize the floating-point neural network 410 to a fixed-point neural network 420 (e.g., a 16-bit or low fixed-point neural network). The hardware accelerator may be dedicated hardware for driving the fixed-point neural network 420, and thus may be implemented with relatively low power or low performance hardware. Thus, the hardware accelerator may be optimized for a fixed-point operation rather than a floating-point operation. The hardware accelerator may correspond to, but is not limited to, a neural processing unit (NPU), a tensor processing unit (TPU), and/or a neural engine, which may be dedicated modules for driving a neural network.

The hardware accelerator for driving the quantized neural network 420 may be implemented in the same device as the neural network quantization apparatus 10. However, the hardware accelerator is not limited thereto, and the hardware accelerator may be implemented in a separate device that is independent of the neural network quantization apparatus 10.

Figure 5:
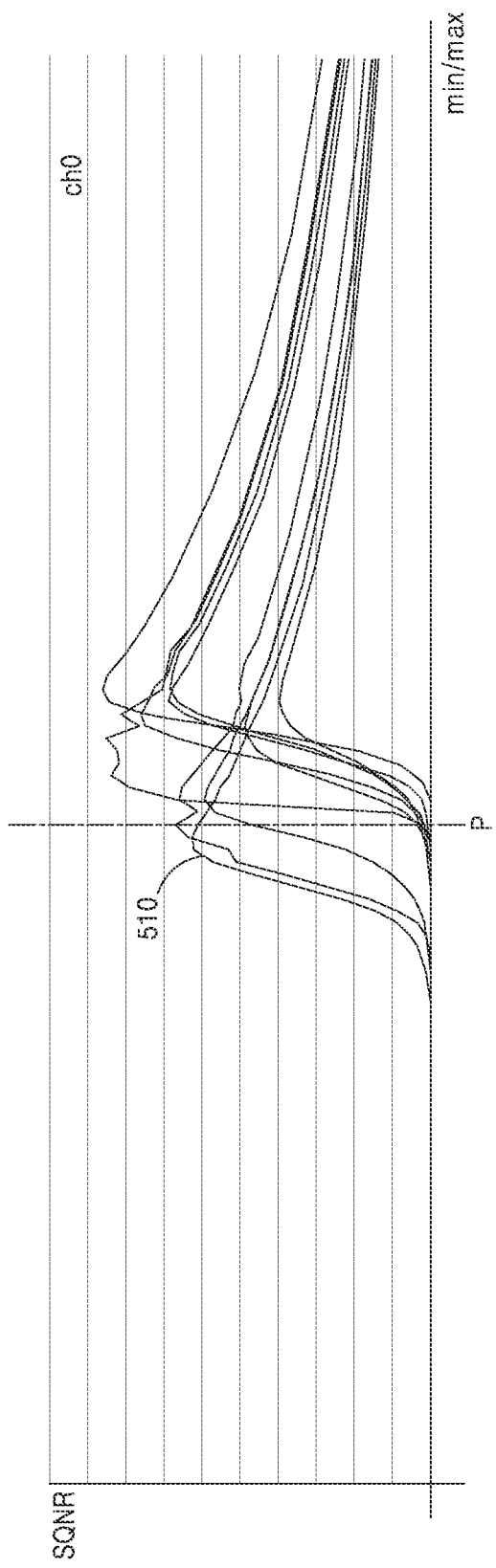
FIG. 5 illustrates a graph showing a signal to quantization noise ratio (SQNR) of a quantization apparatus.

FIG. 5 illustrates a graph showing a signal to quantization noise ratio (SQNR) of a quantization apparatus.

FIG. 5 illustrates quantization results of a channel 0 (ch 0) according to an input of a data set. Each plot of FIG. 5 indicates a quantization result corresponding to an input of each piece of data included in the data set. In FIG. 5, the x axis indicates a lower value minima of a quantization range and/or an upper value maxima of the quantization range, and the y axis indicates an SQNR. The SQNR means a signal to quantization noise ratio, and, as the SQNR decreases, inaccuracy of quantization may increase. That is, an increased SQNR may result in an increased accuracy of quantization.

As shown in FIG. 5, a quantization result (or an accuracy thereof) corresponding to an input of each piece of data may significantly decrease at or below its critical point. For example, a quantization result 510 for an input of one of the data included in the data set significantly decreases at or below a critical point p.

There is a technological problem in that a typical quantization apparatus may quantize floating-point values ranging between a statistical minimum value minima and a statistical maximum value maxima, without considering the SQNR. Accordingly, when the typical quantization apparatus sets the statistical minimum value minima and the statistical maximum value maxima to be less than the critical point, the typical quantization apparatus may not perform accurate quantization. Accordingly, a quantization apparatus according to one or more embodiments may improve upon the typical quantization apparatus and solve the technological problem by implementing a method of setting a quantization range that takes into account the SQNR.

As shown in FIG. 5, because the data included in the data set may have different critical points where the SQNR significantly decreases, when a typical quantization apparatus uniformly selects one critical point and performs quantization, there is a technological problem in that inaccuracy of quantization is not addressed. Furthermore, when a final critical point is simply calculated through arithmetic averaging of the different critical points without considering the level of an SQNR for each piece of data, there is a technological problem in that the typical quantization apparatus outputs an inaccurate quantization result.

Accordingly, a quantization apparatus according to one or more embodiments may improve upon the typical quantization apparatus and solve the technological problem by implementing a method of calculating an optimal critical point for performing quantization in consideration of a weight corresponding to the level of the SQNR and correcting the quantization range, based on the optimal critical point, which will now be described in detail.

Figure 6:
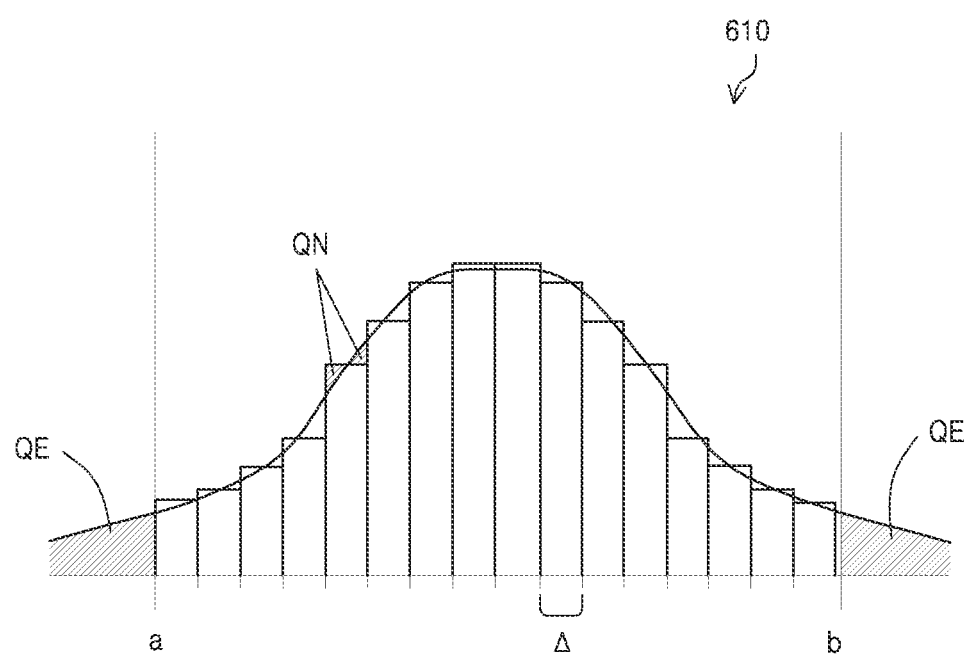
FIG. 6 illustrates a graph for explaining a method setting a first quantization range, according to one or more embodiments.

FIG. 6 illustrates a graph for explaining a method setting a first quantization range, according to one or more embodiments.

Referring to FIG. 6, as a data set is input to a neural network pre-trained by using floating points, a unique distribution of floating point values (i.e., parameter values) may be generated for each of the channels with respect to a layer. According to an embodiment, the data set may be a training data set used to train the neural network pre-trained before quantization is performed. For example, the data set may be image samples, the number of which may be less than or equal to a predetermined number. According to an embodiment, the parameter values may be floating-point activations used by each of the channels included in each of the feature maps and kernels.

The processor 110 may analyze a statistical distribution of floating-point parameter values for each of the channels included in each of the feature maps and kernels from the pre-trained neural network. The processor 110 may obtain profile information for each channel, based on the statistical distribution for each channel.

The profile information for each channel may include at least one of a mean, a variance, an expected value, skewness, kurtosis, hyper skewness, and hyper kurtosis of the parameter values. The skewness may be a characteristic value representing the direction and degree of asymmetry regarding a mean in a statistical distribution, and may be determined based on a third moment related to the mean of the parameter values. The kurtosis may be a criterion representing the degree to which the statistical distribution is centrally distributed around a central tendency value or the degree of sharpness of the statistical distribution, and may be determined based on a fourth moment related to the mean of the parameter values. The hyper skewness and the hyper kurtosis may be determined based on fifth and sixth moments related to the mean of the parameter values, respectively. However, embodiments of the present disclosure are not limited thereto, and the profile information for each channel may include various other criteria related to the statistical distribution of parameter values.

The processor 110 may determine, for each channel, a probability density function (PDF) that normalizes the statistical distribution of the floating-point parameter values, based on the profile information for each channel.

The processor 110 may determine, for each channel, one of a plurality of PDFs to correspond to the profile information for each channel.

According to an embodiment, the plurality of PDFs may include a LaPlace distribution, a hyper secant distribution, a logistic distribution, a Gaussian distribution, a raised-cosine distribution, a Wigner distribution, and/or a uniform distribution. However, embodiments of the present disclosure are not limited thereto, and the plurality of PDFs may further include various probability distributions such as a Super Cauchy distribution. FIG. 6 illustrates a case where the processor 110 may determine the statistical distribution of parameter values to be a normalized distribution 610, as a non-limiting example.

The processor 110 may determine, for each channel, a first quantization range for performing quantization of floating-point parameter values, based on a quantization error QE and a quantization noise QN of the determined PDF.

The quantization error QE may mean distortion that is generated by parameter values existing in a section of the normalized distribution 610 where quantization is not performed. Accordingly, the quantization error QE may mean an overload distortion. As a quantization range increases, the quantization error QE may decrease. In other words, as a statistical upper value b of the quantization range increases and/or a statistical lower value a of the quantization range decreases, the number of parameter values existing in the section of the normalized distribution where quantization is not performed decreases, and thus the quantization error QE may decrease.

The quantization noise QN may mean a distortion that is generated due to a difference between floating-point parameter values and fixed-point parameter values in a section of the normalized distribution where quantization is performed. Accordingly, the quantization noise QN may mean a granular distortion. When the neural network quantization apparatus 10 has a fixed step size $\Delta$, the quantization noise QN may increase as the quantization range increases. In other words, when the step size $\Delta$ is fixed, as the statistical upper value b of the quantization range increases and/or the statistical lower value a of the quantization range decreases, a distortion of the floating-point parameter values and the fixed-point parameter values increases, and thus the quantization noise QN may increase.

The processor 110 may calculate the quantization error QE and the quantization noise QN that are generated when performing quantization based on the statistical distribution of parameter values that is the determined PDF.

The processor 110 may calculate the quantization error QE, based on the area of the section of the normalized distribution where quantization is not performed. The processor 110 may calculate the quantization noise QN, based on an area that is generated due to a difference between floating-point parameter values and fixed-point parameter values in the section of the normalized distribution where quantization is performed.

The processor 110 may calculate the statistical lower value a and the statistical upper value b of parameter values such that a sum of the quantization error QE and the quantization noise QN is a minimum. That is, as the quantization error QE may decrease and the quantization noise QN may increase when the statistical upper value b increases and/or the statistical lower value a decreases, the processor 110 may determine the statistical lower value a and the statistical upper value b such that the sum of the quantization error QE and the quantization noise QN is minimized. The sum of the quantization error QE and the quantization noise QN being a minimum may mean that an overall distortion (being a sum of the overload distortion and the granular distortion) is minimum. The absolute value of the statistical lower value a and the absolute value of the statistical upper value b may be equal to each other.

In detail, when the step size Δ is fixed, the processor 110 may calculate the statistical lower value a and the statistical upper value b both satisfying a first condition and a second condition.

Under the first condition, a sum of the area of the section where quantization is not performed (e.g., an area of the quantization error QE) and the area generated due to a difference between the floating-point parameter values and the fixed-point parameter values in the section where quantization is performed (e.g., an area of the quantization noise QN) may be a minimum.

Under the second condition, the statistical lower value a and the statistical upper value b may have the same absolute values.

The processor 110 may determine a range between the calculated statistical lower value a and the calculated statistical upper value b to be the first quantization range.

When a typical neural network quantization apparatus performs quantization based on a first quantization range determined without considering the SQNR, there is a technological problem in that an inaccurate quantization result may be generated. Accordingly, in one or more embodiments, the processor 110 may improve upon the typical neural network quantization apparatus and solve the technological problem by correcting the determined first quantization range based on the SQNR.

Figure 7:
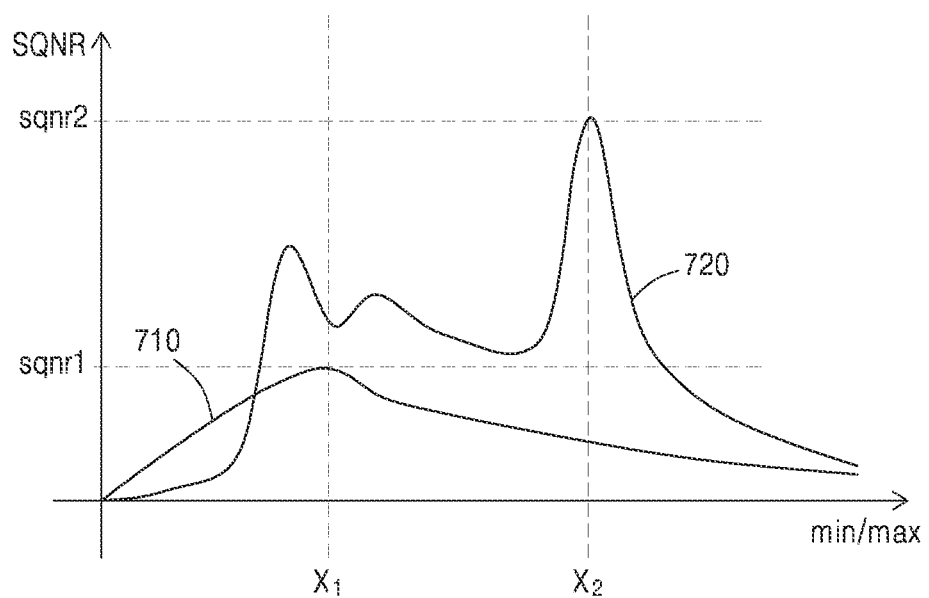
FIG. 7 illustrates a graph for explaining a method setting a second quantization range, according to one or more embodiments.

FIG. 7 illustrates a graph for explaining a method setting a second quantization range, according to one or more embodiments.

In more detail, FIG. 7 illustrates a quantization result of the neural network quantization apparatus 10 according to an input of each of the data included in a data set. Although FIG. 7 illustrates that the data set includes first data and second data, this is merely an example. The number of data included in the data set may increase or decrease, and may include other data in addition to the first data and the second data, in an example. According to an embodiment, the data set may be the same as a training data set used to train the neural network pre-trained before quantization is performed. For example, the data set may be image samples, the number of which may be less than or equal to a predetermined number.

Referring to FIG. 7, a first quantization result 710 according to an input of the first data may be different from a second quantization result 720 according to an input of the second data. The processor 110 may obtain first and second statistical points x1 and x2 of parameter values where the SQNR is maximum, from respective quantization results for the data. The processor 110 may obtain the first statistical point x1 where the SQNR is maximum (e.g., sqnr1) from the first quantization result 710, and obtain the second statistical point x2 where the SQNR is maximum (e.g., sqnr2) from the second quantization result 720.

The processor 110 may calculate a critical point cp for correcting the first quantization range, based on a normalized weighted sum operation of the first and second statistical points x1 and x2. The processor 110 may calculate the critical point cp by using Equation 2 below, for example.

$$cp = \frac{1}{m}\sum_{i}^{m} \frac{sqnr_i^n}{sqnr_{all}^n} \times x_i \qquad \text{Equation 2}$$

In Equation 2, m indicates the number of data included in the data set, $x_i$ indicates statistical points of parameter values where the respective SQNRs for the data are maximum, $sqnr_{all}$ indicates a sum of the respective SQNRs for the data, and $sqnr_i$ indicates the respective SQNRs of the statistical points.

In Equation 2, $$\frac{sqnr_i}{sqnr_{all}}$$

is a weight for a normalized weighted sum operation and may be expressed as an n-th order function. The processor 110 may adjust the order of the weight to determine an optimal critical point cp. According to an embodiment, the processor 110 may increase the number n to correspond to a difference between the maximum and minimum values of the SQNR for each piece of data, because, when the difference between the maximum and minimum values of the SQNR for each piece of data is small and the critical point cp is determined, an influence of the weight due to the SQNR may be small but the respective locations of the statistical points are important. According to another embodiment, the processor 110 may adjust the number n, based on one of the mean, variance, and skewness of the SQNR for each piece of data.

The processor 110 may determine the second quantization range, based on the calculated critical point cp. The processor 110 may determine the absolute value of the critical point cp to be the absolute value of the lower value of the second quantization range and to be the absolute value of the upper value of the second quantization range. In other words, the processor 110 may determine a range between -|cp| and |cp| to be the second quantization range.

The processor 110 may correct the first quantization range, based on the second quantization range. A method of correcting the first quantization range will now be described with reference to FIG. 8.

Figure 8:
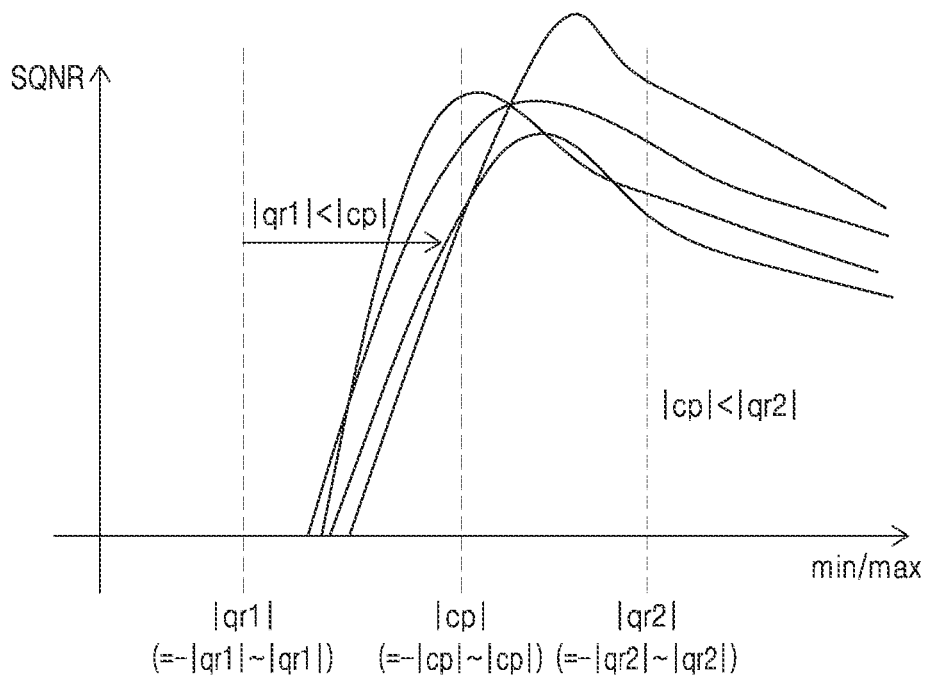
FIG. 8 illustrates a graph for explaining a method correcting a first quantization range, according to one or more embodiments.

FIG. 8 illustrates a graph for explaining a method correcting the first quantization range, according to one or more embodiments.

Each graph of FIG. 8 indicates a quantization result corresponding to an input of each of the data included in a data set. In FIG. 8, the x axis indicates the absolute value of the lower value of a quantization range and/or the absolute value of the upper value of the quantization range, and the y axis indicates an SQNR. Referring to FIGS. 6 and 7 above, the processor 110 may set each of the first quantization range and the second quantization range to be symmetrical about a starting point (0). Thus, the absolute value of the lower value of the quantization range and the absolute value of the upper value of the quantization range may be equal to each other in FIG. 8.

Referring to FIG. 8, when the absolute value of the lower or upper value of the first quantization range is less than the absolute value of a critical point (i.e., when |qr1|<|cp|), the processor 110 may correct the first quantization range. In other words, when a lower value -|qr1| of the first quantization range is greater than a lower value -|cp| of the second quantization range (i.e., when -|cp| < -|qr|), the processor 110 may correct the lower value -|qr1| of the first quantization range. When an upper value |qr1| of the first quantization range is less than an upper value |cp| of the second quantization range (i.e., when |qr1| < |cp|), the processor 110 may correct the first quantization range.

When the absolute value of the lower value of the first quantization range is less than the absolute value of the critical point or when the absolute value of the upper value of the first quantization range is less than the absolute value of the critical point (i.e., when |qr1|<|cp|), the processor 110 may correct the first quantization range to the second quantization range. In other words, when the lower value -|qr1| of the first quantization range is greater than the lower value -|cp| of the second quantization range, the processor 110 may correct the lower value -|qr1| of the first quantization range to the lower value -|cp| of the second quantization range. When the upper value |qr1| of the first quantization range is less than the upper value |cp| of the second quantization range, the processor 110 may correct the upper value |qr1| of the first quantization range to the upper value |cp| of the second quantization range. Accordingly, when the first quantization range (-|qr1| to |qr1|) is less than the second quantization range (-|cp| to |cp|), the processor 110 may correct the first quantization range to be the second quantization range.

Because the SQNR does not significantly decrease at or above the absolute value |cp| of the critical point, the processor 110 may not correct the first quantization range when the absolute value |cp| of the critical point is less than the absolute value of the lower or upper value of the first quantization range (i.e., when |cp|<|qr2|). In other words, when the lower value -|qr2| of the first quantization range is less than the lower value -|cp| of the second quantization range (i.e., when -|qr2| < -|cp|) and when the upper value |qr2| of the first quantization range is greater than the upper value |cp| of the second quantization range (i.e., when |cp| < |qr2|), the processor 110 may not correct the first quantization range. Accordingly, when the first quantization range (-|qr2| to |qr2|) is greater than the second quantization range (-|cp| to |cp|), the processor 110 may determine not correct the first quantization range.

Accordingly, the neural network quantization apparatus 10 may set an optimal quantization range by avoiding a range in which the SQNR significantly increases.

Figure 9:
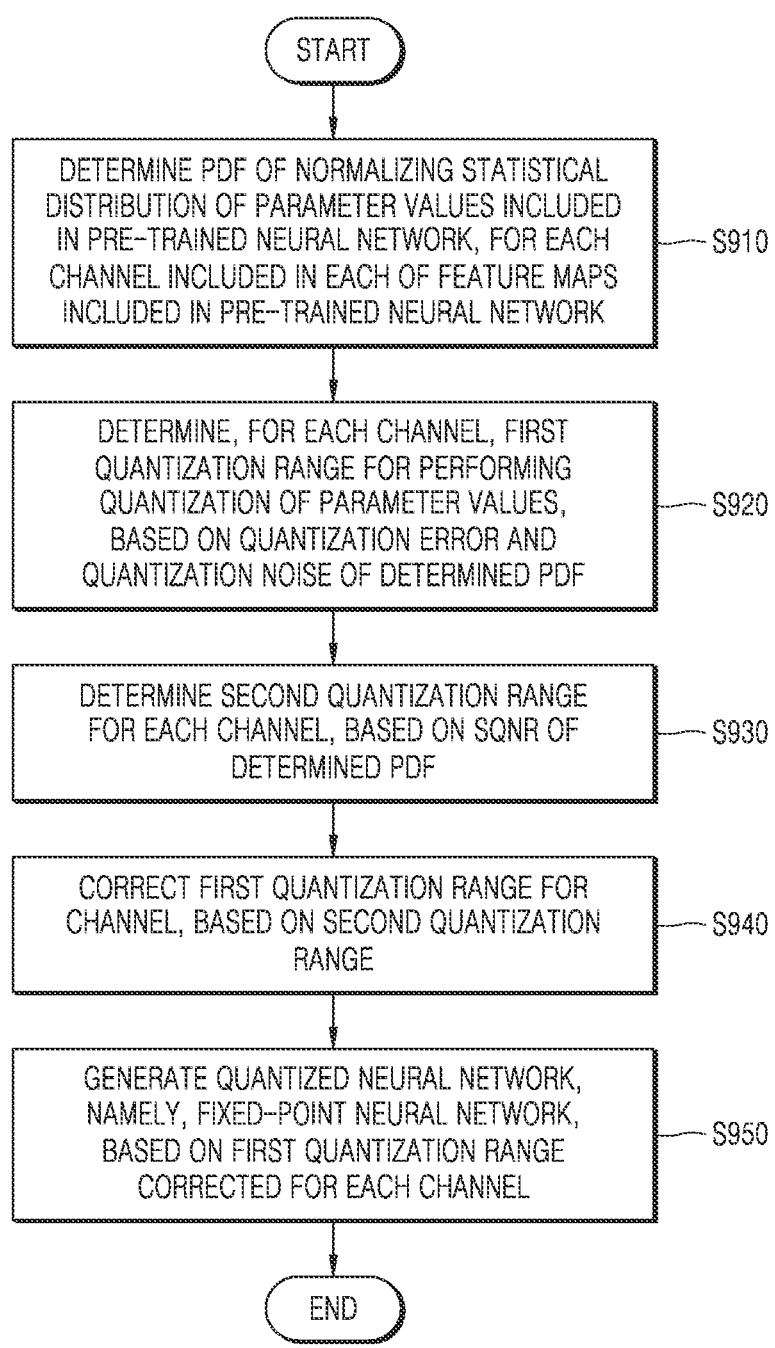
FIG. 9 illustrates a flowchart of a method quantizing parameters of a neural network, according to one or more embodiments.

FIG. 9 illustrates a flowchart of a method quantizing parameters of a neural network, according to an embodiment one or more embodiments.

The method of FIG. 9 may be performed by the processor 110 of the above-described neural network quantization apparatus 10.

Referring to FIG. 9, in operation S910, the processor 110 may determine a PDF of normalizing a statistical distribution of parameter values included in a pre-trained neural network, for each of the channels included in each of the feature maps included in the pre-trained neural network.

In detail, as a data set is input to a neural network pre-trained by using floating points, a unique distribution of parameter values may be generated for each of the channels included in a layer.

The data set may be a training data set used to train the pre-trained neural network before quantization is performed. For example, the data set may be image samples, the number of which may be less than or equal to a predetermined number. For example, the data set may be ten or less randomly-selected image samples, but is not limited thereto.

The parameter values may be floating-point activations used by, or resulting in, each of the channels included in each of the feature maps and kernels included in the pre-trained neural network.

Various operations may be performed as the data set is input to the pre-trained neural network, and floating-point parameter values of each of the channels included in each of the feature maps and kernels included in the pre-trained neural network may be determined.

The processor 110 may analyze a statistical distribution of floating-point parameter values for each of the channels included in each of the feature maps and kernels from the pre-trained neural network. The processor 110 may obtain respective profile information for each channel, based on the statistical distribution for each channel.

The respective profile information for each channel may include at least one of a mean, a variance, an expected value, skewness, kurtosis, hyper skewness, and hyper kurtosis of the parameter values. The skewness is a characteristic value representing the direction and degree of asymmetry regarding a mean in a statistical distribution, and may be determined based on a third moment related to the mean of the parameter values of a corresponding channel. The kurtosis is a criterion representing the degree to which the statistical distribution is centrally distributed around a central tendency value or the degree of sharpness of the statistical distribution, and may be determined based on a fourth moment related to the mean of the parameter values of a corresponding channel. The hyper skewness and the hyper kurtosis may be determined based on fifth and sixth moments related to the mean of the parameter values, respectively of a corresponding channel. However, embodiments of the present disclosure are not limited thereto, and the respective profile information for each channel may include various other criteria related to the statistical distribution of parameter values.

The processor 110 may determine, for each channel, one of a plurality of PDFs to correspond to the profile information for each channel. The processor 110 may determine, for each channel, a PDF that normalizes the statistical distribution of the floating-point parameter values, based on the profile information for each channel.

The plurality of PDFs may be previously defined to represent a statistical distribution of the floating-point parameter values that are used for each of the channels included in each of the feature maps and kernels. The plurality of PDFs may include a LaPlace distribution, a hyper secant distribution, a logistic distribution, a Gaussian distribution, a raised-cosine distribution, a Wigner distribution, or a uniform distribution. However, embodiments of the present disclosure are not limited thereto, and the plurality of PDFs may further include various probability distributions such as a Super Cauchy distribution. Information about the plurality of PDFs may be stored in the memory 120.

In operation S920, the processor 110 may determine, for each channel, a first quantization range for performing quantization of parameter values, based on a quantization error QE and a quantization noise QN of the determined PDF.

The first quantization range may mean a section of the determined PDF where quantization is performed.

In operation S930, the processor 110 may determine a second quantization range for each channel, based on the SQNR of the determined PDF.

The second quantization range may mean a range of a quantization result where the SQNR significantly decreases. A method setting the first quantization range will be described in detail with reference to FIG. 10, and a method setting the second quantization range will be described in detail with reference to FIG. 11.

In operation S940, the processor 110 may correct the first quantization range for each channel, based on the second quantization range.

When the lower value of the first quantization range is greater than the lower value of the second quantization range, the processor 110 may correct the lower value of the first quantization range to the lower value of the second quantization range. When the upper value of the first quantization range is less than the upper value of the second quantization range, the processor 110 may correct the upper value of the first quantization range to the upper value of the second quantization range.

Because the SQNR does not significantly decrease at or above the absolute value of the critical point, when the lower value of the first quantization range is less than the lower value of the second quantization range and when the upper value of the first quantization range is greater than the upper value of the second quantization range, the processor 110 may not correct the first quantization range.

In operation S950, the processor 110 may generate a quantized neural network, based on the first quantization range corrected for each channel.

The processor 110 may determine a quantization level relating to the fractional length of a fixed-point expression to which parameters of a corresponding channel are to be quantized based on the determined PDF and the corrected first quantization range.

The processor 110 may determine a fixed-point expression capable of statistically covering floating-point values existing within the first quantization range in the determined PDF. According to an embodiment, the processor 110 may determine a fractional length of the fixed-point expression such that a quantization error is minimized when the number of bits representing the fixed-point expression is fixed.

The processor 110 may generate a quantized fixed-point neural network, based on the fixed-point expression determined for each channel. For example, the processor 110 may quantize floating-point parameters of channel 0 to a fixed-point expression having a fractional length capable of statistically covering a distribution range of the floating-point parameter values of channel 0, based on a fixed-point expression determined for channel 0. The processor 110 may also quantize floating-point parameters of each of the remaining channels to fixed-point expressions having fractional lengths capable of statistically covering the floating-point parameter values of the remaining channels. When the processor 110 of one or more embodiments performs quantization in units of channels, a quantization accuracy may significantly increase, compared with when a typical processor performs quantization in units of layers.

Activations that are used in each of the channels included in each of the output feature maps of the pre-trained neural network may vary according to the type of data set that is input to the pre-trained neural network, but a probability distribution of the weights included in each of the kernels of the pre-trained neural network may be previously determined while the pre-trained neural network is being generated. Accordingly, the processor 110 may not perform the above-described operations with respect to the weights. The processor 110 may perform quantization with respect to the weights by using a method of obtaining the maximum values of the weights included in each of the kernels from the data of the pre-trained neural network and determining a fractional length of a fixed-point expression for representing the weights, based on the obtained maximum values. However, embodiments are not limited thereto.

Figure 10:
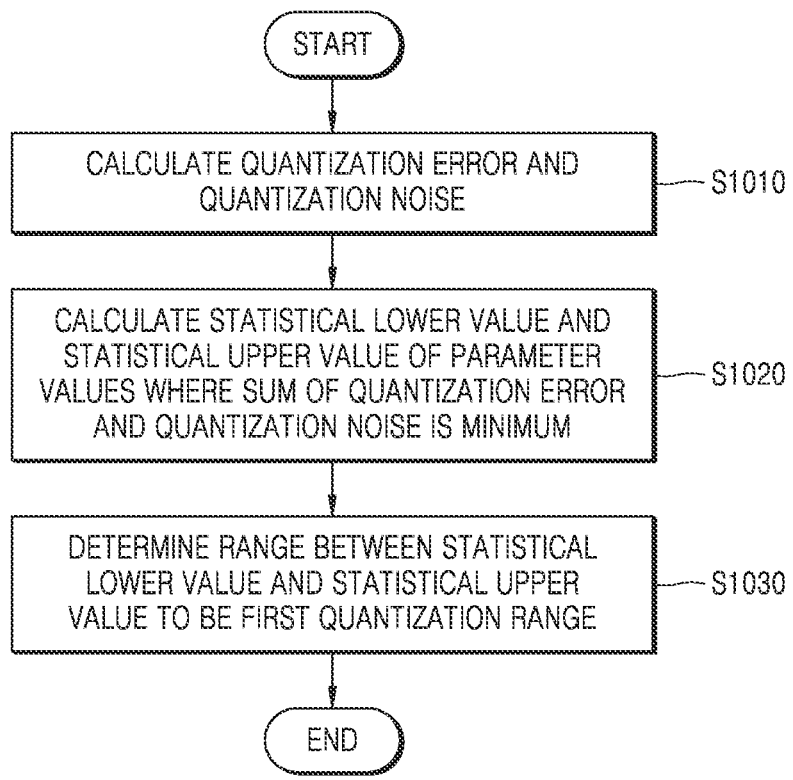
FIG. 10 illustrates a flowchart of a method setting a first quantization range according to one or more embodiments.

FIG. 10 illustrates a flowchart of a method setting a first quantization range (e.g., the first quantization range of FIG. 9) according to one or more embodiments.

Referring to FIG. 10, in operation S1010, the processor 110 may calculate the quantization error QE and the quantization noise QN that are generated when performing quantization based on the statistical distribution of parameter values that is the determined PDF.

The processor 110 may calculate the quantization error QE, based on the area of the section of the normalized distribution where quantization is not performed, when the step size Δ has been fixed. The processor 110 may calculate the quantization noise QN, based on the area that is generated due to the difference between floating-point parameter values and fixed-point parameter values in the section of the normalized distribution where quantization is performed, when the step size Δ has been fixed.

In operation S1020, the processor 110 may calculate the statistical lower value a and the statistical upper value b of parameter values where a sum of the quantization error QE and the quantization noise QN is minimum. The processor 110 may determine the floating-point parameter values to have a symmetric distribution, and may determine the first quantization range. Accordingly, the processor 110 may set the absolute value of the statistical lower value a and the absolute value of the statistical upper value b to be equal to each other.

In operation S1030, the processor 110 may determine a range between the statistical lower value a and the statistical upper value b to be the first quantization range.

Figure 11:
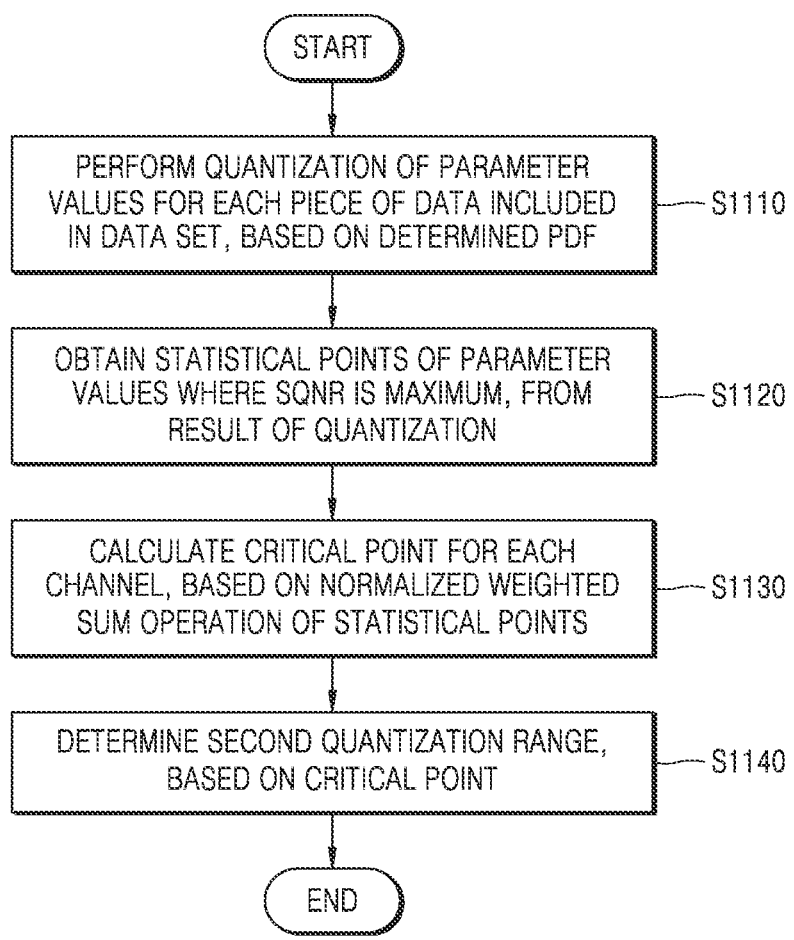
FIG. 11 illustrates a flowchart of a method setting a second quantization range according to one or more embodiments.

FIG. 11 illustrates a flowchart of a method setting a second quantization range (e.g., the second quantization range of FIG. 9) according to one or more embodiments.

Referring to FIG. 11, when floating-point parameter values are quantized to fixed-point parameter values, an SQNR may be generated. The processor 110 may measure the SQNR by comparing a quantized neural network and an unquantized neural network. Because the SQNR is related to the precision of quantization, the processor 110 may correct the first quantization range, based on the SQNR of a quantization result.

In operation S1110, the processor 110 may perform quantization of the parameter values for each of the data included in the data set, based on the determined PDF.

The processor 110 may perform quantization of the parameter values, for each channel.

In operation S1120, the processor 110 may obtain, for each piece of data, statistical points of the parameter values where the SQNR is maximum, from a result of the quantization.

In operation S1130, the processor 110 may calculate the critical point cp for each channel, based on a normalized weighted sum operation of the statistical points.

The processor 110 may calculate the critical point cp for each channel by using Equation 2 above. As shown in Equation 2, the processor 110 may use the respective SQNRs of the statistical points as a weight for a normalized weighted sum operation.

In operation S1140, the processor 110 may determine the second quantization range, based on the critical point cp.

The processor 110 may determine the absolute value of the critical point cp to be the absolute value of the lower value of the second quantization range and the absolute value of the upper value of the second quantization range.

In other words, the processor 110 may determine a range between -|cp| and |cp| to be the second quantization range.

Figure 12:
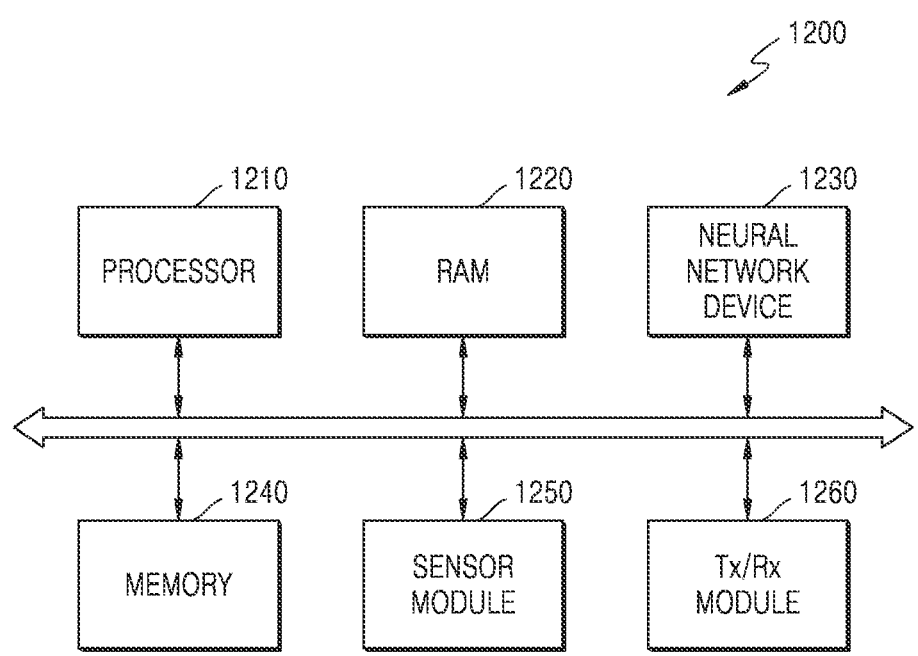
FIG. 12 illustrates a block diagram electronic system according to one or more embodiments.

FIG. 12 illustrates a block diagram electronic system according to one or more embodiments.

Referring to FIG. 12, the electronic system 1200 may extract valid information by analyzing input data in real time based on using a neural network, and may determine a situation based on the extracted valid information or control the components of an electronic device in which the electronic system 1200 is mounted. For example, the electronic system 1200 may be applied to in drones, robot apparatuses (such as advanced driver-assistance systems (ADASs)), smart televisions (TVs), smartphones, medical devices, mobile devices, image display devices, measuring devices, and IoT devices, and may be mounted in at least one of various other kinds of electronic devices. In another example, the electronic system 1200 includes the electronic device, or the electronic system 1200 is external to the electronic device.

The electronic system 1200 may include a processor 1210 (e.g., one or more processors), a RAM 1220, a neural network device 1230, a memory 1240 (e.g., one or more memories), a sensor module 1250, and a communication (Tx/Rx) module 1260. The electronic system 1200 may further include one or more other components, such as an input/output module, a security module, and a power control device. Some of the hardware components of the electronic system 1200 may be mounted on at least one semiconductor chip. The neural network device 1230 may be the above-described neural network dedicated hardware accelerator or a device including or implementing the neural network dedicated hardware accelerator.

The processor 1210 may control all operations of the electronic system 1200. The processor 1210 may include a single processor core or a plurality of processor cores. The processor 1210 may process or execute the programs and/or data stored in the memory 1240. According to some embodiments, the processor 1210 may control functions of the neural network device 1230 by executing the programs stored in the memory 1240. The processor 1210 may be implemented as a CPU, a GPU, or an AP, for example.

The RAM 1220 may temporarily store programs, data, or instructions. For example, the programs and/or data stored in the memory 1240 may be temporarily stored in the RAM 1220 under the control of the processor 1210 or according to a boot code. The RAM 1220 may be implemented as DRAM or SRAM.

The neural network device 1230 may perform an operation of a neural network, based on the received input data, and may generate an information signal, based on a result of the operation. The neural network may be, but is not limited to, a CNN, an RNN, a deep belief network, or a restricted Boltzman machine. The neural network device 1230 is a hardware device that performs a process by using a neural network that has been quantized to the above-described fixed-point neural network, and may correspond to or implement the above-described neural network dedicated hardware accelerator.

The information signal may include one of various kinds of recognition signals such as a voice recognition signal, an object recognition signal, an image recognition signal, and a bio-information recognition signal. For example, the neural network device 1230 may receive frame data included in a video stream as input data, and may generate, from the frame data, a recognition signal regarding an object included in an image represented by the frame data. However, embodiments are not limited thereto, and the neural network device 1230 may receive various kinds of input data according to the types or functions of electronic devices in which the electronic system 1200 is mounted, and may generate recognition signals according to the various kinds of input data.

The memory 1240 is a storage for storing data, and may store, for example, an operating system (OS), various kinds of programs, and various kinds of data. According to an embodiment, the memory 1240 may store intermediate results generated in an operation of the neural network device 1230, such as an output feature map, in the form of an output feature list or an outer feature matrix. According to an embodiment, the memory 1240 may store a compressed output feature map. The memory 1240 may also store quantized neural network data, such as parameters, weight maps, or a weight list, that are used by the neural network device 1230.

The memory 1240 may be, but is not limited to, DRAM. The memory 1240 may include either one or both of volatile memory and nonvolatile memory. Examples of the nonvolatile memory include ROM, PROM, EPROM, EEPROM, flash memory, PRAM, MRAM, RRAM, and FeRAM. Examples of the volatile memory may include DRAM, SRAM, SDRAM, PRAM, MRAM, RRAM, and FeRAM. According to one or more embodiments, the memory 1240 may include any one or any combination of any two or more of HDD, SSD, CF, SD, Micro-SD, Mini-SD, xD or memory stick.

The sensor module 1250 may collect information about the surroundings of the electronic device in which the electronic system 1200 is mounted. The sensor module 1250 may sense or receive a signal, such as an image signal, a voice signal, a magnetic signal, a biometric signal, or a touch signal, from outside the electronic device, and may convert the sensed or received signal to data. To this end, the sensor module 1250 may include at least any one or any combination of any two or more of various types of sensing devices, such as a microphone, a photographing device, an image sensor, a light detection and ranging (LIDAR) sensor, an ultrasonic sensor, an infrared sensor, a biosensor, or a touch sensor.

The sensor module 1250 may provide the neural network device 1230 with the converted data as input data. For example, the sensor module 1250 may include an image sensor, and may generate a video stream by photographing the external environment of the electronic device and provide the neural network device 1230 with consecutive data frames of the video stream in order as input data. However, the sensor module 1250 is not limited thereto, and the sensor module 1250 may provide various other types of data to the neural network device 1230.

The Tx/Rx module 1260 may include various wired or wireless interfaces capable of communicating with external devices. For example, the Tx/Rx module 1260 may include a local area network (LAN), a wireless local area network (WLAN) such as Wi-Fi, wireless fidelity (Wi-Fi), a wireless personal area network (WPAN) such as Bluetooth, a wireless universal serial bus (USB), ZigBee, near-field communication (NFC), radio-frequency identification (RFID), power-line communication (PLC), or a communication interface capable of connecting to a mobile cellular network such as 3rd generation (3G), 4th generation (4G), long-term evolution (LTE), or 5th Generation (5G).

According to an embodiment, the Tx/Rx module 1260 may receive data about a quantized neural network from the external device. The external device may be a device, such as the neural network quantization apparatus 10 of FIG. 3, that trains a neural network based on a large amount of data, quantizes the trained neural network to a fixed-point type neural network, and provides data of the quantized neural network to the electronic system 1200. The received data of the quantized neural network may be stored in the memory 1240.

The neural network quantization apparatuses, processors, memories, electronic systems, RAMs, neural network devices, sensor modules, communication (Tx/Rx) modules, neural network quantization apparatus 10, processor 110, memory 120, electronic system 1200, processor 1210, RAM 1220, neural network device 1230, memory 1240, sensor module 1250, communication (Tx/Rx) module 1260, and other apparatuses, units, modules, devices, and other components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:
    determining a respective probability density function (PDF) of normalizing a statistical distribution of parameter values, for each channel of each of a plurality of feature maps of a pre-trained neural network;
    determining, for each channel, a corresponding quantization range for performing quantization of corresponding parameter values, based on the respective determined PDF;
    correcting, for each channel, the corresponding quantization range based on a signal-to-quantization noise ratio (SQNR) of the respective determined PDF; and
    generating a quantized neural network, based on the corrected quantization range corresponding for each channel.

2. The method of claim 1, wherein the determining of the corresponding quantization range comprises, for each channel:
    determining a quantization error and a quantization noise of the determined PDF;
    determining a statistical lower value and a statistical upper value of the parameter values such that a sum of the quantization error and the quantization noise is a minimum; and
    determining a range between the statistical lower value and the statistical upper value to be the quantization range.

3. The method of claim 2, wherein an absolute value of the statistical lower value is equal to an absolute value of the statistical upper value.

4. The method of claim 1, wherein the correcting of the corresponding quantization range comprises, for each channel:
    performing quantization of the parameter values for each piece of data of a data set, based on the determined PDF;
    from a result of the quantization, obtaining a statistical point of the parameter values where the SQNR is maximum, for each piece of the data of the data set; and
    correcting the quantization range, based on a critical point.

5. The method of claim 4, further comprising calculating the critical point using respective SQNRs of the statistical points as a weight for a normalized weighted sum operation.

6. The method of claim 4, wherein the correcting the quantization range, based on the critical point comprises, for each channel, determining an absolute value of the critical point to be an absolute value of a lower value and an absolute value of an upper value of a correction range for correcting the quantization range.

7. The method of claim 1, wherein the correcting of the corresponding quantization range comprises, for each channel:
    in response to a lower value of the quantization range being greater than a lower value of a correction range for correcting the quantization range, correcting the lower value of the quantization range to the lower value of the correction range, and
    in response to an upper value of the quantization range being less than an upper value of the correction range, correcting the upper value of the quantization range to the upper value of the correction range.

8. The method of claim 1, wherein the determining of the PDF comprises, for each channel:
    inputting a data set to the pre-trained neural network;
    obtaining, for each channel, profile information of the parameter values that correspond to an input of the data set; and
    determining, for each channel, one of a plurality of PDFs as corresponding to the profile information.

9. The method of claim 1, wherein the plurality of PDFs comprises any combination of any two or more of a LaPlace distribution, a hyper secant distribution, a logistic distribution, a Gaussian distribution, a raised-cosine distribution, a Wigner distribution, a uniform distribution, and a Super Cauchy distribution.

10. The method of claim 1, wherein the generating of the quantized neural network comprises:
    determining, for each channel, a fixed-point expression of the parameter values within the corrected quantization range, based on the predetermined PDF; and
    quantizing, for each channel, the parameter values to fixed-point parameter values, based on the determined fixed-point expression.

11. The method of claim 1, wherein the parameter values include floating-point activations used by each channel of each of the plurality of feature maps.

12. A non-transitory computer-readable storage medium storing instructions that, when executed by a processor, configure the processor to perform the method of claim 1.

13. A neural network apparatus, the apparatus comprising:
    a processor configured to:
        determine a respective probability density function (PDF) of normalizing a statistical distribution of parameter values, for each channel of each of a plurality of feature maps of a pre-trained neural network;
        determine, for each channel, a corresponding quantization range for performing quantization of the corresponding parameter values, based on the respective determined PDF;
        correct, for each channel, the corresponding quantization range based on a signal-to-quantization noise ratio (SQNR) of the respective determined PDF; and
        generate a quantized neural network, based on the corrected quantization range corresponding for each channel.

* * * * *